May 22, 1962 R. G. FERRIS ET AL 3,035,874
TROLLEY
Filed April 27, 1959
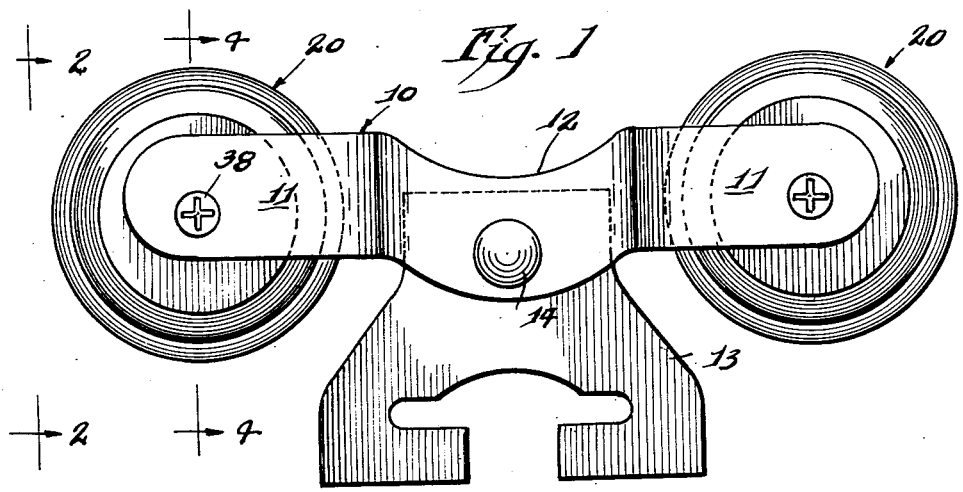
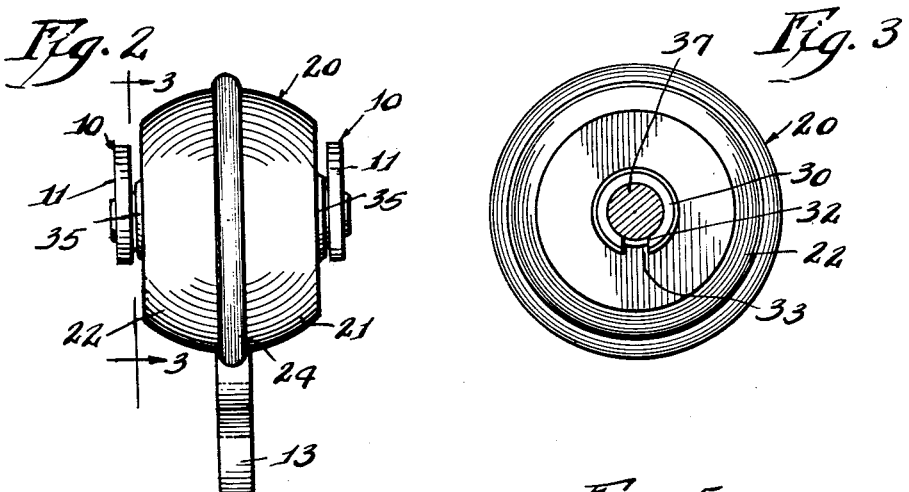
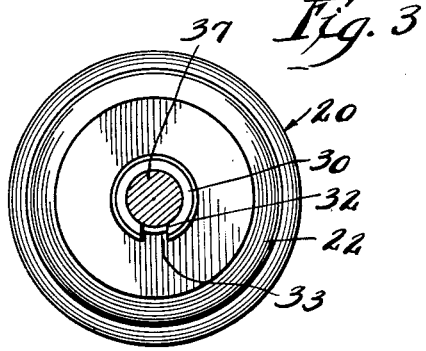
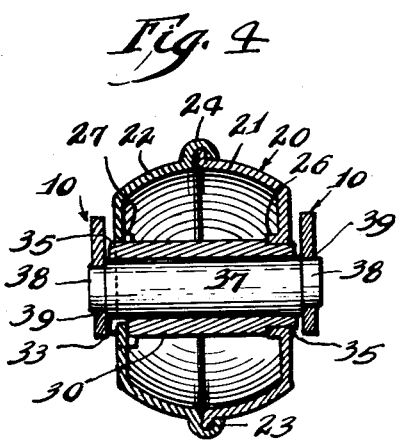
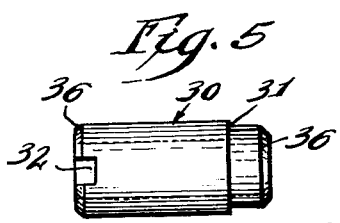
Inventors
Robert G. Ferris
Robert L. Yuenger
By Hofgren, Brady,
Wegner, Allen & Stellman
Attorneys

United States Patent Office 3,035,874
Patented May 22, 1962

3,035,874
TROLLEY
Robert G. Ferris and Robert L. Yuenger, Harvard, Ill., assignors to Starline, Inc., a corporation of Illinois
Filed Apr. 27, 1959, Ser. No. 808,982
6 Claims. (Cl. 308—18)

This invention relates to trolleys for hanging sliding doors and the like, and more particularly to improved bearing structures for rotatably mounting the wheels of such trolleys.

In general, trolleys of the character mentioned include a pair of spaced generally parallel side plates for supporting a door hanger and which are in turn supported by one or more wheels or rollers movable along a tubular track or the like positioned above the path of the sliding door. The trolley wheels, one or more, are positioned between the side plates and are rotatable relative to the plates.

In the past, the trolley wheels have been rotatably mounted on the plates as by lubricated steel roller bearings of the type described in R. G. Ferris Patent 2,151,590, for example. While bearings of this type have proved entirely serviceable, their use has been attended by certain disadvantages and problems which it would be desirable to avoid. More particularly, one of the problems has arisen due to the fact that the ends of the bearings were not lubricated, with the result that the wheel engaging one or both of the side plates of the trolley caused a scraping and grinding which produced steel particles that found their way into the roller bearing and materially reduced the serviceable life of the bearing.

It is a general object of this invention to provide a new and improved trolley of the type described which avoids the problems and disadvantages of prior trolleys referred to above.

It is also an object of the invention to provide a new and improved bearing for mounting trolley wheels of the character mentioned.

An important feature of the present invention is the provision of a bearing which prevents engagement of the trolley wheel with the side plates and thereby produces a materially lengthened serviceable trolley life with substantially consistent efficiency over extended periods of time. The bearing is simple and economical to manufacture, and facilitates assembly of the trolley parts.

The bearing of the present invention is a sleeve type bushing preferably of a molded plastic material having a predetermined shape which facilitates the molding of the bearing and enables rapid assembly of the bearing with the remaining trolley parts. More particularly, in a preferred form the sleeve is provided with an outer annular shoulder at one end which abuts the inside of the wheel at one side thereby to prevent axial movement of the bearing in one direction, and has at the other end a notch for receiving a lug on the wheel at the other side thereby to prevent axial movement of the bearing in the opposite direction and to prevent rotation of the bearing in the wheel. The bearing is longer than the wheel and thereby prevents engagement of the wheel with the side plates.

The invention is illustrated in a preferred embodiment in the accompanying drawings, in which:

FIG. 1 is a side elevational view of a trolley embodying the principles of the present invention;

FIG. 2 is an end elevational view of the trolley illustrated in FIG. 1;

FIG. 3 is a sectional view taken at about the line 3—3 of FIG. 2;

FIG. 4 is a sectional view taken at about the line 4—4 of FIG. 1; and

FIG. 5 is a bottom plan view of an improved sleeve bearing made according to the principles of the present invention.

Referring to the drawings in greater detail, a trolley of the character mentioned includes a pair of side plates 10, having spaced parallel end portions 11 and having intermediate portions as at 12 which curve inwardly toward each other. The curved central portions, at the middle, are spaced apart widely enough to receive therebetween a stirrup or hanger 13 having an upper portion positioned between the plates and pivotally mounted thereon as by a pin 14. The lower portion of the stirrup or hanger 13 is formed for attachment in a suitable fashion to the top of a sliding door for a barn, hangar or other industrial establishment.

At opposite ends of the side plates, wheels or rollers 20 are mounted by means of the improved bearing structure of this invention. The wheels 20 and the bearing structures for the wheels are identical, and only one will be described in detail, with the understanding that the other conforms to that described.

Each of the wheels comprises a pair of roller halves, one of which may be described as the inner half identified by the reference number 21, and one which may be described as the outer half identified by the reference number 22. It will be noted that the inner half 21 includes an annular, outwardly turned flange 23 which is embraced by a doubled-over annular terminal portion 24 on the outer wheel half, the two wheel halves being joined and rigidly held together in this fashion.

In use, the wheels of the trolley may be positioned inside a tubular track having a cross section, circular or other, conforming generally to the shape of the wheels, with the flanges 24 and the stirrup 13 projecting downwardly through a longitudinal slot in the lower portion of the track.

As will be best understood by reference to FIG. 4 the hollow wheel 20 has a central opening therethrough which is defined by an inwardly directed annular flange 26 on the inner wheel half 21 and an almost completely annular inwardly turned flange 27 on the outer wheel half 22. Within the axial opening, a tubular or sleeve bearing or bushing 30 is positioned and suitably attached to the wheel for movement therewith. Preferably, one end of the bearing 30 is provided with an annular shoulder as at 31 (see FIG. 5) adapted to abut the annular flange 26 on the inner wheel half 21 to prevent axial movement of the bearing relative to the wheel in a direction toward the right as viewed in FIG. 4. Preferably, the opposite end of the bearing 30 is provided with an axially outwardly opening notch therethrough as at 32 for receiving a radially inwardly directed lug 33 on the outer wheel half 22 to thereby retain the bearing against axial movement relative to the wheel in a direction toward the left as viewed in FIG. 4 and at the same time to prevent rotation of the bearing relative to the wheel.

As seen best in FIGS. 2 and 4, the sleeve bearing 30 has a length somewhat greater than the width (or length) of the wheel 20 in order that opposite terminal portions as at 35 will project beyond the wheel slightly in order to prevent scraping and grinding of the rotating wheel against the side plates 10. Preferably, opposite ends of the bearing are chamfered as at 36 (FIG. 5).

The bearing member 30 is preferably made of a commercially available material comprised of nylon and graphite powder and oil which is molded by placing nylon and graphite powder in a mold and compressing it under oil at such temperature that the nylon and graphite are sintered and at the same time the oil is captured in the pores or crevices between the nylon and graphite particles.

The central axial opening through the sleeve bearing 30 receives a pin 37 rotatably mounted in the bearing and having reduced opposite end portions as at 38 positioned in complementary openings in the respective sides plates 10 at the end portions 11. After assembly, the end portions 38 are swaged as at 39 to retain the pin 38 in position.

It should be understood that one of the important advantages of the present construction lies in the specific shape of the bearing 30, firstly to prevent scraping and grinding of the wheel 30 against the side plates 10, secondly to facilitate the molding operation by which the bearing is formed, and thirdly to facilitate assembly of the trolley parts. More particularly, it should be noted that the right end of the bearing is provided with an annular shoulder 31 which expedites assembly as compared to a notch and lug construction as no time is required for orientation of the lug with the notch. The left end of the bearing as illustrated in FIGS. 4 and 5 may be formed without an annular shoulder similar to that at 31 since the notch 32 which prevents rotation also prevents axial movement.

In an accelerated test using a 400 pound door actuated to travel four feet in each direction at a rate of 14 cycles per minute it has been found that the average roller bearing of the type mentioned previously would stand use for about 25 hours whereas the bearing of this invention showed little or no wear at the end of 100 hours, or 100 miles of travel. Coefficient of friction tests indicate that while the roller bearings when new may require a slightly less push on the door and thus have less friction, at the end of six months use the bearing of the present invention is much more efficient and requires less push than lubricated steel bearings subjected to similar wear.

The foregoing detailed description is given for clearness of understanding only and no unnecessary limitations should be understood therefrom, as modifications will be obvious to those skilled in the art.

We claim:

1. A wheel assembly for a door hanger trolley, comprising: a hollow wheel having a central axial opening therethrough, a tubular plastic bearing positioned in the opening, said bearing having an annular axially outwardly facing shoulder thereon adjacent one end thereof and having adjacent the other end thereof a notch therein providing an axially outwardly directed shoulder and opposed circumferentially disposed shoulders, said wheel having at one end thereof an axially inwardly directed annular shoulder engaging the annular shoulder on the bearing thereby to prevent axial movement of the bearing in the wheel in one direction, and said wheel having at the other end thereof a radially inwardly directed lug disposed in said notch and preventing axial movement of the bearing in the wheel in the opposite direction and preventing rotation of the bearing relative to the wheel.

2. A wheel assembly, comprising: a hollow wheel including a pair of hollow wheel halves positioned axially adjacent each other and joined rigidly together to provide a unitary rotary wheel, said wheel halves having aligned central openings providing a central axial opening through the wheel, a tubular bearing of oil-containing plastic material positioned in said wheel opening, said bearing having a reduced outer diameter adjacent one end providing an axially outwardly directed shoulder and having at the other end an axially outwardly opening notch therethrough, one of said wheel halves having adjacent the opening therethrough an axially inwardly directed annular flange positioned on the reduced outer diameter of said bearing and engaging said annular shoulder, and said other wheel half having adjacent the opening therethrough a radially inwardly directed lug positioned in said notch.

3. A molded plastic bearing sleeve for a wheel having an axial opening therethrough for receiving the sleeve, an annular inwardly facing shoulder adjacent one end of the opening and a radially inwardly projecting lug adjacent the other end of the opening, said sleeve having a substantially uniform inner diameter and having adjacent one end thereof a reduced outer diameter providing an annular axially outwardly facing shoulder for engaging the annular inwardly facing shoulder on the wheel and having at the opposite end an axially outwardly opening notch therethrough for receiving the lug on the wheel and providing an axially outwardly facing shoulder and opposed circumferentially spaced radially disposed shoulders for cooperation with complementary shoulders on the wheel lug.

4. A trolley for hanging sliding doors and the like, comprising: a pair of spaced side plates for supporting a hanger, a wheel positioned between the side plates, an axial opening through the wheel, a sleeve bearing of oil-containing plastic material positioned in the opening extending through the wheel, said bearing having a length greater than that of the wheel to prevent engagement of the wheel with the side plates, an annular outwardly facing shoulder on the bearing adjacent one end thereof, an annular inwardly facing shoulder on the wheel adjacent one end thereof engaging the outwardly facing shoulder on the bearing to prevent axial movement of the bearing in the wheel in one direction, a notch in the bearing at the opposite end from said shoulder, a radial lug on the wheel positioned in the notch to prevent axial movement of the bearing in the wheel in the opposite direction and to prevent rotation of the wheel relative to the bearing, and an axle pin rotatable in the bearing and attached at opposite ends to the side plates.

5. A wheel assembly for a door hanger trolley, comprising: a wheel having an axial opening therethrough, a sleeve bearing positioned in the opening extending through the wheel, an annular outwardly facing shoulder on the bearing adjacent one end thereof, an annular inwardly facing shoulder on the wheel adjacent one end thereof engaging the outwardly facing shoulder on the bearing to prevent axial movement of the bearing in the wheel in one direction, and an interfitting notch and lug at the opposite end of the wheel and bearing, one on the bearing and one on the wheel, including abutting surfaces preventing axial movement of the bearing in the wheel in the opposite direction and preventing rotation of the wheel relative to the bearing.

6. The combination as defined in claim 5, wherein said sleeve bearing is comprised of plastic material and has a length greater than the length of the wheel so that opposite ends of the sleeve extend outwardly of the wheel ends.

References Cited in the file of this patent

FOREIGN PATENTS

| | | |
|---|---|---|
| 729,656 | Penprase | June 2, 1903 |
| 947,759 | Putnam | Jan. 25, 1910 |
| 1,010,781 | Minshull | Dec. 5, 1911 |
| 1,647,610 | Crum | Nov. 1, 1927 |
| 2,497,224 | Laure | Feb. 14, 1950 |
| 2,610,514 | Long | Sept. 16, 1952 |